United States Patent [19]

Rust et al.

[11] 4,329,256

[45] May 11, 1982

[54] PROCESS FOR THE MANUFACTURE OF A MIXED CATALYST

[75] Inventors: Kurt Rust, Kelkheim; Ludwig Brinkmann, Frankfurt am Main; Paul Lutz, Flörsheim am Main, all of Fed. Rep. of Germany

[73] Assignee: Hoechst Aktiengesellschaft, Frankfurt am Main, Fed. Rep. of Germany

[21] Appl. No.: 241,665

[22] Filed: Mar. 9, 1981

Related U.S. Application Data

[63] Continuation of Ser. No. 54,922, Jul. 5, 1979, abandoned.

[30] Foreign Application Priority Data

Jul. 7, 1978 [DE] Fed. Rep. of Germany ....... 2830039

[51] Int. Cl.$^3$ ............................. C08F 4/02; C08F 4/64
[52] U.S. Cl. ................................ 252/429 B; 526/125; 526/151; 526/152
[58] Field of Search ..................................... 260/429 B

[56] References Cited

U.S. PATENT DOCUMENTS

| | | | |
|---|---|---|---|
| 4,107,414 | 8/1978 | Giannini et al. | 526/114 |
| 4,107,913 | 8/1978 | Giannini et al. | 526/114 |
| 4,121,030 | 10/1978 | Candlin et al. | 252/429 B X |
| 4,130,503 | 12/1978 | Fodor | 252/429 B |
| 4,134,855 | 1/1979 | Candlin et al. | 252/429 B |
| 4,143,223 | 3/1979 | Toyota et al. | 252/429 B X |
| 4,263,168 | 4/1981 | Rochefort et al. | 252/429 B |
| 4,263,169 | 4/1981 | Scata et al. | 252/429 B |
| 4,265,785 | 5/1981 | Giannini et al. | 252/429 B |
| 4,279,776 | 7/1981 | Shiga et al. | 252/429 B |
| 4,287,328 | 9/1981 | Kikuta et al. | 252/429 B X |
| 4,290,915 | 9/1981 | Toyota et al. | 252/429 B |

FOREIGN PATENT DOCUMENTS

| | | | |
|---|---|---|---|
| 1958046 | 6/1970 | Fed. Rep. of Germany | 252/429 B UX |
| 1720787 | 7/1971 | Fed. Rep. of Germany | 252/429 B UX |
| 2230672 | 12/1972 | Fed. Rep. of Germany | 252/429 B UX |
| 2461677 | 7/1975 | Fed. Rep. of Germany | 252/429 B UX |
| 2656055 | 6/1977 | Fed. Rep. of Germany | 252/429 B UX |
| 1255038 | 11/1971 | United Kingdom | 252/429 B UX |
| 1292853 | 10/1972 | United Kingdom | 252/429 B UX |
| 1387888 | 3/1975 | United Kingdom | 252/429 B UX |
| 1387889 | 3/1975 | United Kingdom | 252/429 B UX |
| 1387890 | 3/1975 | United Kingdom | 252/429 B UX |
| 1485520 | 9/1977 | United Kingdom | 252/429 B UX |

*Primary Examiner*—Paul F. Shaver
*Attorney, Agent, or Firm*—Curtis, Morris & Safford

[57] ABSTRACT

A catalyst system of such high efficiency that the purification of the polymer can be dispensed with is obtained by first reacting a magnesium halide with an electron donor and/or a cyclopolyene, bringing the product obtained into contact with a TiCl$_3$-containing compound and using a stereoregulator. The system has a high stereospecificity whereby the proportion of atactic polymer is kept low. No excess amount of transition metal halides is required and the polymer obtained has uniform coarse particles and a very low halogen content.

19 Claims, No Drawings

PROCESS FOR THE MANUFACTURE OF A MIXED CATALYST

This is a continuation, of application Ser. No. 54,922 filed July 5, 1979, now abandoned.

The present invention relates to a process for the manufacture of a mixed catalyst for stereospecific polymerization of 1-olefins, with the special aim of producing isotactic polypropylene from which catalyst residues need not be removed.

Catalysts have been described which are prepared by plating finely divided salts of the magnesium chloride type with titanium or vanadium halides (cf. U.S. Pat. No. 3,238,146). With the use of catalysts of this type propylene can be polymerized with satisfactory yield, but it is disadvantageous that at most 1% by weight of the transition metal halide can be applied onto the carrier. Consequently, polypropylene produced with these catalysts contains a relatively high amount of catalyst residues and, therefore, it must be purified after polymerization.

There have also been proposed catalysts for the polymerization of α-olefins which have been obtained by reaction of an organic compound of a group I, II or III metal of the Periodic Table with a product obtained by milling a partially reduced halide of a transition metal with an amount less than 50 mol % of a halide of a group II or III metal (cf. U.S. Pat. No. 3,130,003). $TiCl_3$ is used as the partially reduced transition metal compound; it is prepared by reducing $TiCl_4$ with hydrogen or Ti. The preferred group II or III metal halide is aluminum chloride. The propylene polymers obtained with a catalyst of this type have a satisfactory stereospecificity, but the relatively low yield necessitates a purification of the polypropylene. A further disadvantage resides in the fact that the yield considerably decreases in the presence of hydrogen which is required to regulate the molecular weight.

Another catalyst system described is obtained by reacting the reaction product of a titanium halide and an organo-aluminum compound with the complex of a Friedel-Crafts halide and an organic compound for regulating the stereospecificity (U.K. Pat. No. 1,001,820). As Friedel-Crafts halides there are used, for example, aluminum chloride, zinc chloride or magnesium chloride. As stereoregulating compounds, which are generally electron donors, there are used, inter alia, hexamethyl-phosphoric acid trisamide, diphenyl ether or dimethyl formamide. This catalyst system makes it possible to produce a polypropylene having a stereospecificity exceeding 90%, but the yield obtained is unsatisfactory.

Another catalyst system has been described which is obtained by milling $TiCl_3$ with magnesium chloride (cf. DE-OS No. 1,958,046). In this case $TiCl_3$ is used in an amount of less than 50% by weight, calculated on the magnesium chloride used. Organo-aluminum compounds are used as activators. Good yields are obtained with these catalysts in the polymerization of ethylene, but they are not well-suited for the polymerization of propylene.

Catalysts have also been proposed which are obtained by milling magnesium halides with complexes from titanium halides with electron donor compounds, using 0.01 to 30% by weight of titanium halide, calculated on the amount of magnesium halide (cf. DE-OS No. 2,029,992). As activator aluminum alkyl compounds are used. In the polymerization of ethylene these catalysts give good yields, but they are not well-suited for the polymerization of propylene.

Still further, catalysts are known which are prepared by milling magnesium or manganese halides with titanium-tetrahalide-electron donor complexes and which are used, together with the addition or substitution reaction product of aluminum alkyl compounds and electron donor compounds, for the polymerization of propylene (cf. DE-OS No. 2,230,672). These catalysts are distinguished by a high activity in the propylene polymerization. The stereospecificity (isotactic index) is below 94%. But, inspite of the high yields, the proportion of catalyst residues in the polymer is not sufficiently low for all purposes.

Finally, a catalyst system has been proposed with which the polymerization of propylene can be carried out with a particularly high yield (cf. DE-OS No. 2,643,143). In this case, magnesium chloride is ground together with an electron donor compound, especially an ester of an aromatic carboxylic acid, for example benzoic acid ethyl ester. The ground product is then reacted with a rather large amount of titanium tetrachloride. The catalyst component obtained in this manner is thoroughly washed with a hydrocarbon. As activator, aluminum trialkyl in combination with an ester of an aromatic carboxylic acid, for example p-toluic acid ethyl ester, is used. This catalyst system has the disadvantage that large amounts of titanium tetrachloride have to be used since a small amount of Ti only is fixed. Moreover, the polypropylene obtained with this catalyst system contains a relatively large proportion of fine particles below 100 μm. A further drawback is the high ash content resulting from the large amount of carrier and a chlorine content exceeding 50 ppm.

It is an object of the present invention to develop a catalyst system with which high yields can be obtained so that a working up of the polymer can be dispensed with and the polymer obtained has a sufficiently high stereospecificity so that the proportion of atactic polymer is extremely low. Moreover, it is an aim to manufacture a catalyst system without using an excess amount of transition metal halide and to obtain the polymer in the form of uniform coarse particles. Finally, the polymer should have a very low halogen content.

It has now been found that the aforesaid can be achieved by first reacting a magnesium halide with an electron donor and/or a cyclopolyene, contacting the product formed with a $TiCl_3$-containing compound, using as activator a halogen-free organo-aluminum compound and employing a stereoregulator.

The present invention, therefore, provides a process for the manufacture of a mixed catalyst by bringing into contact a transition metal halide with a magnesium halide complex and mixing the reaction product (component A) with a halogen-free organo-aluminum compound (component B) and a stereoregulator (component C), which comprises preparing component A by contacting the reaction product of a magnesium halide with an electron donor and/or a cyclopolyene with the reaction product obtained by reduction of titanium tetrachloride with an organic compound of a metal of main group I, II or III of the Periodic Table of the elements in an inert diluent at a temperature of from −50° C. to +80° C., using as component B a halogen-free organo-aluminum compound and using as component C a compound selected from the group consisting of cyclopolyenes, phosphinic acid esters, hexamethylphosphoric acid trisamide, 1,2-dimethoxybenzene and aromatic carboxylic acid esters.

Consequently, the mixed catalyst according to the invention consists of
- (A) a titanium chloride-containing component obtained by contacting (a) the reaction product of a magnesium halide with an electron donor and/or a cyclopolyene with (b) the reaction product obtained by reduction of titanium tetrachloride with an organic compound of a metal of main group I, II or III of the Periodic Table, in an inert diluent at a temperature of from −50° C. to +80° C.,
- (B) a halogen-free organo-aluminum compound and
- (C) a stereoregulator.

Magnesium dichloride is the preferred magnesium halide. If desired, magnesium dibromide can also be used.

The reaction product of the magnesium halide with the electron donor and/or the cyclopolyene (a) can be prepared in known manner in the presence or absence of an inert solvent at a temperature of from −20° C. to 100° C., for example by heating the magnesium halide in a solution of the other reaction component, suspending the magnesium halide in the other liquid reaction component or by milling the two components with each other, possibly at an elevated temperature resulting from the frictional heat. The optimum temperature depends on the thermal stability of the electron donor or the cyclopolyene used.

Operating in the absence of a solvent is preferred; for example the magnesium halide is milled with the pure electron donor compound and/or the cyclopolyene, preferably in a vibration mill. The time of milling is in the range of from 1 to 120 hours or even longer, preferably 30 to 100 hours. Other comminution methods are also suitable in which a sufficiently high shearing force is excerted on the material to be milled.

The magnesium halide and the electron donor and/or cyclopolyene are used in a molar proportion greater than 2:1, preferably of from 3 to 15:1 and more preferably 4.5 to 8:1.

The reaction product of magnesium halide and electron donor compound and/or cyclopolyene used for making catalyst component A should have a specific surface area of at least 1 m²/g, preferably of greater than 4 m²/g.

Suitable electron donor compounds are ethers, amides, amines, esters, ketones, nitriles, phosphines, phosphinic acid esters, phosphorus amides, thioethers or thioesters. The electron donor compounds to be used should not contain any hydrogen bound to oxygen, nitrogen or sulfur.

Examples of suitable electron donor compounds are diethyl ether, dioxane, anisole, dimethyl acetamide, tetramethyl ethylene diamine, acetic acid ethyl ester, acetone, acetophenone, acetonitrile, benzonitrile, triethyl phosphine, methylethylphosphinic acid isobutyl ester, and hexamethylphosphoric acid trisamide.

Preferred electron donor compounds are esters of aromatic carboxylic acids such as benzoic acid ethyl ester, benzoic acid methyl ester, p-toluic acid ethyl ester, p-toluic acid methyl ester, anisic acid ethyl ester and anisic acid methyl ester.

Cyclopolyenes to be used for the reaction with the magnesium halide are, for example, cycloheptatriene-1,3,5 and cyclooctatetraene.

Reaction product (b) obtained by reduction of titanium tetrachloride with organo-metal compounds of the elements of main group I, II or III of the Periodic Table does not consist of pure titanium trichloride, it additionally contains organometal compounds linked in unknown manner.

Suitable reducing agents are preferably organoaluminum compounds of the formula $AlR_{3-n}X_n$ in which R denotes alkyl having from 1 to 6 carbon atoms, X is either a radical R or a halogen atom and n is zero, 1 or 2. Compounds of this type are, for example, aluminum diethyl chloride, aluminum dipropyl chloride, aluminum diisopropyl chloride, aluminum diisobutyl chloride, preferably aluminum diethyl chloride; or aluminum alkyl sequichlorides, i.e., equimolar mixtures of aluminum dialkyl chloride and aluminum alkyl dichloride, preferably aluminum ethyl sequichloride; and aluminum trialkyls such as aluminum trimethyl, aluminum triethyl, aluminum tripropyl, aluminum triisobutyl, aluminum tridiisobutyl, preferably aluminum triethyl and aluminum triisobutyl, as well as the reaction products of aluminum trialkyls or aluminum dialkyl hydrides, in which the alkyl radicals have from 1 to 6 carbon atoms, with dienes containing from 4 to 8 carbon atoms. A suitable compound of the latter class is, for example, the reaction product of aluminum triisobutyl or aluminum diisobutyl hydride with isoprene which are available on the market by the name of aluminum isoprenyl.

The reduction is carried out in an inert, saturated, liquid aliphatic hydrocarbon, for example butane, pentane, hexane, heptane, octane or cyclohexane, or a hydrocarbon mixture such as a gasoline fraction boiling in the range of from 130° to 170° C., or in a liquid aromatic hydrocarbon such as benzene, toluene, or xylene. Hexane, the specified gasoline fraction and toluene are preferred.

Reaction of titanium tetrachloride with the organo-aluminum compound is effected by adding the tetrachloride, optionally in the form of a solution in an inert solvent, to the solution of the organo-aluminum compound, or vice versa. Alternatively, the two components can be introduced simultaneously into an inert reaction medium. It is preferred to add the organoaluminum compound to titanium tetrachloride.

In the reduction the molar proportion of titanium tetrachloride to organo-aluminum compound can vary in the range of from 1:0.2 to 1:1.5, preferably 1:0.33 to 1:1.1.

TiCl₄ can also be reduced by the organo-aluminum compound in the presence of an ether. In this case, the ether is preferably mixed with the titanium tetrachloride and then the organo-aluminum compound is added. Suitable ethers are those of the formula $R^1-O-R^2$ in which $R^1$ and $R^2$, which can be identical or different, denote alkyl having from 2 to 18 carbon atoms, for example diethyl ether, di-n-propyl ether, di-n-butyl ether, ethyl-n-butyl ether, di-isoamyl ether, dioctyl ether and didodecyl ether, preferably di-n-butyl ether and diisoamyl ether. Titanium tetrachloride and ether are used in a molar proportion of from 1:0.3 to 1:1.5, preferably 1:0.9 to 1:1.1.

The reducing of titanium tetrachloride with the organo-aluminum compound is carried out at a temperature of from −50° C. to +80° C., preferably −20° C. to +25° C.

To complete the reduction, the reaction product can be subjected to a thermal treatment at a temperature of from 40° to 150° C., either in one stage or in two stages, in the first stage, for example, at a temperature of from 60° to 95° C. and in the second stage at a temperature exceeding 100° C.

In the reaction of titanium tetrachloride with the organo-aluminum compound, optionally in the presence of ethers, soluble and insoluble reaction products are formed in the reaction medium. The insoluble reaction product (b) can be isolated and freed from soluble reaction products by washing with the solvent used in the reduction.

Next, the magnesium dihalide-electron donor- and/or cyclopolyene-reaction product (a) is contacted with the reaction product of titanium tetrachloride and an organo-metal compound (b). The latter compound can be used either in the form of a pure solid separated from the reaction medium or in admixture with the other reaction products resulting from the reduction reaction. Alternatively, only the soluble reaction products are used.

Components (a) and (b) are preferably contacted with each other in an inert hydrocarbon. It proved advantageous to add the suspension of reaction product (a) in an inert hydrocarbon to the reaction product of titanium tetrachloride and organo-metal compound (b). Alternatively, (a) and (b) can be combined simultaneously. Best reults are obtained by adding component b to component a. The components are contacted with each other at a temperature of from −50° to 150° C., preferably 20° to 100° C.

The amounts of reactants (a) and (b) used are of decisive importance to the activity of the catalysts and the ash and halogen content of the polymers. The content of the reaction product of magnesium halide with the electron donor and/or cyclopolyene (a) in catalyst component A should be kept as low as possible. The amount of titanium trichloride should exceed 30% by weight and preferably be in the range of from 40 to 200% by weight, more preferably 50 to 140% by weight, calculated on reaction product (a).

For the manufacture of the titanium trichloride-containing catalyst component A it is also possible to dry mill components (a) and (b) or to mill them in a hydrocarbon. The two components are contacted with each other for a period of time of from 10 minutes to 600 minutes, preferably 60 to 300 minutes.

Suitable halogen-free, organo-aluminum compounds (component B) are, above all, unsubstituted aluminum alkyls of the formula $AlR_3^3$ in which $R^3$ denotes alkyl having from 1 to 10 carbon atoms, for example aluminum trimethyl, aluminum triethyl, aluminum triisobutyl and aluminum tridiisobutyl. Also suitable are the reaction products of aluminum triisobutyl or aluminum diisobutyl hydride with isoprene available on the market under the name aluminum isoprenyl. Especially good results can be obtained with aluminum triethyl and aluminum triisobutyl. The molar proportion of component B to the titanium chloride-containing component A in the mixed catalyst according to the invention should be in the range of from 5 to 200:1, preferably 15 to 50:1.

Component C of the mixed catalyst is a stereoregulator selected from the group consisting of cyclopolyenes, aromatic carboxylic acid esters, phosphinic acid esters, hexamethyl-phosphoric acid trisamide and 1,2-dimethoxybenzene. Especially suitable cyclopolyenes are cycloheptatriene-1,3,5 and cyclooctatetraene, preferred aromatic carboxylic acid esters are methyl benzoate, ethyl benzoate, p-toluic acid ethyl ester, p-toluic acid methyl ester, anisic acid ethyl ester and anisic acid methyl ester and a preferred phosphinic acid ester is methylethyl-phosphinic acid isobutyl ester. The compounds can be used either individually or in admixture, for example cycloheptatriene-1,3,5 with aromatic carboxylic acid esters or cycloheptatriene-1,3,5 with methylethyl-phosphinic acid ester. Reaction of component C with component B, for example by mixing prior to polymerization, should be avoided; rather component C should be directly introduced into the polymerization vessel. The amount of component C depends on the amount of catalyst component B used. The molar proportion of component B to component C should be greater than 1:1, and preferably it is in the range of from 1.5:1 to 15:1.

The catalyst system according to the invention consisting of components A, B and C exhibits high activity in the polymerization of 1-olefins; also high stereospecificity is obtained therewith.

1-Olefins that can be polymerized with the mixed catalyst system according to the invention are those of the formula $CH_2=CHR^4$ in which $R^4$ denotes alkyl having from 1 to 8 carbon atoms, preferably propylene, butene-1, pentene-1, 3-methylbutene-1, 4-methylpentene-1 and 3-methylpentene-1. Best results are obtained with propylene. The catalyst of the invention can be used not only for the homopolymerization but also for the copolymerization of mixtures of the aforesaid olefins with one another and/or with ethylene. A mixture contains from 99.6% to 94% by weight of one of the aforesaid 1-olefins and from 0.4 to 6% by weight of ethylene, each time calculated on the total amount of monomers. Especially preferred are mixtures of propylene with small amounts of ethylene of from 0.5 to 5, preferably 1.5 to 3%, by weight. The mixed catalyst of the invention can also be used for block polymerizing the aforesaid 1-olefins with one another and/or with ethylene, the latter being used in an amount of from 8 to 35% by weight. The manufacture of block polymers from propylene and ethylene proved to be particularly advantageous. Block polymers of this type are distinguished by a high hardness and an outstanding impact strength at temperatures below 0° C.

Polymerization can be carried out either continuously or discontinuously in suspension or in the gaseous phase at a pressure of from 1 to 50 bar, preferably 1 to 40 bar.

Suspension polymerization is carried out in an inert solvent, for example a petroleum fraction having low olefin content and boiling at a temperature in the range of from 60° to 250° C., which must be freed carefully from oxygen, sulfur compounds and moisture, saturated aliphatic and cycloaliphatic hydrocarbons such as butane, pentane, hexane, heptane, cyclohexane, methylcyclohexane, or aromatic compounds such as benzene, toluene and xylene. It proved advantageous to carry out the suspension polymerization in a dispersion agent the same as the 1-olefin to be polymerized, for example in liquid propylene.

Alternatively, the polymerization can be carried out in the gaseous phase, for example in a fluidized bed, in the absence of a solvent.

If necessary, the molecular weight is regulated by adding hydrogen.

The amount of catalyst component A depends on the intended reaction conditions, especially pressure and temperature. In general, 0.005 to 5 millimols, preferably 0.01 to 3 millimols, of $TiCl_3$ are used per liter of solvent in suspension polymerization or per liter of reactor volume in gaseous phase polymerization.

The process of the invention makes it possible to manufacture, polyolefins, especially polypropylene, with high catalyst efficiency and outstanding stereospecificity (isotactic index over 94% or ball indentation hardness greater that 65 N/mm²), and consequently, an expensive catalyst removal can be dispensed with. Moreover, the polymers produced with the mixed catalysts of the invention have a very low content of catalyst residues, especially very low halogen content (Cl less than 50 ppm), and, therefore, they have a low tendency to cause corrosion, a high bulk density (exceeding 400 g/l) with a low proportion of fine particles (less than 100μm) and very good color values.

A further advantage over all processes using catalyst carriers treated with titanium tetrachloride in liquid form resides in the fact that large amounts of titanium tetrachloride need not be used so that an expensive removal of the excess thereof can be dispensed with.

The following Examples illustrate the invention. The gasoline fraction used had a boiling point in the range of from 130° to 170° C. and had been hydrogenated and freed from oxygen prior to use.

EXAMPLE 1

1.1 Preparation of catalyst component A 1

702 g (7.37 mols) of anhydrous magnesium chloride and 170.4 g (1.13 mols) of benzoic acid ethyl ester were milled for 100 hours under nitrogen in a vibration mill. The steel vessel used had a capacity of 5 l and for milling 15 kg of stainless steel balls having a diameter of 15 mm were used.

A 10 l vessel with stirrer was charged, with the exclusion of air and humidity, with 1,090 ml of a hydrogenated, oxygen-free gasoline fraction (boiling range 130° to 170° C.) and 550 ml (5 mol) of titanium tetrachloride. A solution of 1111.2 g of aluminum ethyl sesquichloride (containing 4.5 mols of aluminum diethyl monochloride) in 3334 g of the same gasoline fraction was added dropwise at 0° C. over a period of 8 hours while stirring (250 rpm) under nitrogen. A fine reddish brown precipitate separated. Stirring of the reaction mixture was continued for 2 hours at 0° C. and then for 12 hours at room temperature.

Next, the reaction mixture was heated for 4 hours to 60° C. while stirring under nitrogen. After cooling and settlement of the precipitate, the supernatant mother liquor was decanted and the solid reaction product was washed three times with 2,000 ml each of the gasoline fraction. For further reaction the solid was suspended in such an amount of the gasoline fraction that 1 liter of the suspension contained 1 mol of TiCl₃. The content of trivalent titanium in the suspension was determined by titration with a cerium$^{III}$ solution.

6.56 g of the reaction product of magnesium chloride and benzoic acid ethyl ester were suspended in 100 ml of the gasoline fraction and while stirring under argon at 80° C. 19.3 ml (19.3 millimols) of the TiCl₃-containing suspension were added over a period of 10 minutes.

The reaction mixture was then kept for 2 hours at 80° C. After cooling to room temperature, the solid (catalyst component A 1) was filtered off with suction with the exclusion of air and humidity and washed twice, each time with 100 ml of the gasoline fraction, and suspended in 100 ml of the gasoline fraction. The titanium content was determined colorimetrically.

1.2 Polymerization of propylene

A 70 liter autoclave with stirrer was charged, with the exclusion of air and humidity and at room temperature, with 35 l of liquid propylene and 0.2 bar of hydrogen and the catalyst components, each diluted with 5 l of liquid propylene, were introduced from a metering system in the following order of succession and in the following amounts: 1.25 millimols (calculated on Ti) of TiCl₃-containing catalyst component A 1, 8.25 millimols (1.32 ml) of p-toluic acid ethyl ester as stereoregulator (component C) and finally 31.25 millimols (4.3 ml) of aluminum triethyl (component B). Polymerization started after a few seconds. The content of the vessel was heated to 75° C. within 10 minutes and then kept at this temperature. The pressure in the vessel amounted to 34 bar. After a time of polymerization of 3 hours, the vessel was cooled to room temperature and the polymer was separated from the liquid propylene which had not been polymerized in a multiple tube filter. The proportion of soluble polymer (atactic polypropylene) formed in the polymerization was determined in the filtrate by evaporation of the propylene and dissolution of the residue. The solid was suspended in about 20 l of the aforesaid gasoline fraction and filtered over a pressure filter. After drying in a vacuum drier at 70° C., 5.9 kg of polypropylene were obtained, corresponding to a catalyst efficiency of 98.6 kg of polypropylene for each g of Ti. The polymer had a bulk density of 400 g/l, a ball indentation hardness of 77 N/mm², determined according to DIN 53 456, and a reduced specific viscosity of 2.6 dl/g, measured at 135° C. in a 0.1% solution in decalin. In the polymerization 3.8% by weight of soluble (atactic) polypropylene, calculated on the total polymer, were formed.

EXAMPLE 2

2.1 Preparation of catalyst component A 2

A 1 liter, four-necked flask provided with stirrer and thermometer was charged under argon with 600 ml of toluene, 360 millimols (60.84 ml) of di-n-butyl ether and 36 millimols (39.6 ml) of titanium tetrachloride (orange-red solution). While stirring at room temperature, a solution of 180 millimols (22.7 ml) of aluminum diethylmonochloride in 60 ml of toluene was then added over a period of 5 minutes. The reaction mixture was maintained at room temperature by cooling. After a stirring period of 3 hours a brown precipitate separated. Stirring of the suspension was continued for 24 hours at room temperature. Cerimetric determination of the Ti$^{III}$ content indicated that 90% of the Ti$^{IV}$ compound used had been transformed into the trivalent stage. The titanium content (total Ti) of the catalyst suspension was determined colorimetrically; it was equal to the amount of Ti used.

16.2 g of the reaction product of magnesium chloride and benzoic acid ethyl ester prepared as described in Example 1.1 were suspended in 100 ml of toluene. 120.7 ml (54 millimols of Ti) of the aforedescribed TiCl₃-containing suspension were then added over a period of 10 minutes at 80° C. and while stirring under argon. The reaction mixture was maintained for 2 hours at 80° C. After cooling to room temperature, catalyst component A 2 was filtered off with suction with the exclusion of air and humidity and washed twice, each time with 100 ml of the gasoline fraction heated to 70° C. Finally it was suspended in 500 ml of the gasoline fraction. The titanium content was determined colorimetrically.

2.2 Polymerization of propylene

Propylene was polymerized and the polymer worked up under the conditions specified in Example 1.2, with the exception that a polymerization temperature of 70° C. was chosen. The catalyst components were added in the following order of succession: 1 millimol (calculated on Ti, =9.3 ml) of the TiCl$_3$-containing catalyst component A 2, 6.6 millimols (1.69 ml) of p-toluic acid ethyl ester as stereoregulator (component C) and 25 millimols (3.2 ml) of aluminum triethyl (component B). 8.6 kg of isotactic propylene were obtained corresponding to a catalyst efficiency of 179.6 kg of polypropylene per g of Ti. The polymer had a bulk density of 430 g/l, a reduced specific viscosity of 13 dl/g, measured at 135° C. in a 0.1% decalin solution, and a ball indentation hardness of 80 N/mm$^2$. The polymer was free from fine particles of a diameter below 60 μm and had a chlorine content of 30 ppm. In the mother liquor a proportion of 1.9%, calculated on the total polymer, of waxy constituents was found.

EXAMPLE 3

3.1 Preparation of catalyst component A 3

A 250 ml, four-necked flask provided with stirrer and thermometer was charged under argon with 150 ml of toluene, 15.2 ml (90 millimols) of di-n-butyl ether and 9.9 ml (90 millimols) of titanium tetrachloride. At 0° C. a solution of 45 millimols (6.17 ml) of aluminum triethyl in 15 ml of toluene was dropped in over a period of 30 minutes. The reaction mixture, in which a dark precipitate separated after about 2 hours, was maintained for 3 hours at 0° C. and then stirred for 24 hours at room temperature. Cerimetric determination of the Ti$^{III}$ content of the suspension indicated that over 95% of the titanium tetrachloride used had been reduced.

6.8 g of the reaction product of magnesium chloride and benzoic acid ethyl ester, prepared as described in Example 1.1, were suspended in 100 ml of toluene and, while stirring at 80° C. under argon, 43.6 ml (20 millimols of Ti) of the above, TiCl$_3$-containing suspension were added over a period of 10 minutes. Next, the reaction mixture was maintained for 2 hours at 80° C. After cooling to room temperature, the solid was filtered off with suction with the exclusion of air and humidity and washed two times, each with 100 ml of toluene and another two times, each time with 100 ml of the gasoline fraction heated to 70° C. Finally, it was suspended in 100 ml of the gasoline fraction and the Ti content was determined colorimetrically.

3.2 Polymerization of propylene

A 16 liter autoclave scavenged with nitrogen and propylene was charged from a metering device, at room temperature and under a hydrogen pressure of 0.2 bar, with 0.375 millimol (calculated on Ti) of the TiCl$_3$-containing catalyst component A 3, suspended in 6.2 l of liquid propylene, 2 millimols (0.32 ml) of p-toluic acid ethyl ester as stereoregulator (component C) dissolved in 3.1 l of liquid propylene and 10 millimols (1.37 ml) of aluminum triethyl (component B) likewise dissolved in 3.1 l of liquid propylene. Polymerization started immediately. The temperature in the vessel was raised to 75° C. within 10 minutes by heating and that temperature was maintained. The pressure in the vessel amounted to 33.5 bar. After a time of polymerization of 3 hours, the autoclave was cooled to room temperature and the pressure was released. After vacuum drying at 70° C.; 3.05 kg of polypropylene were obtained, corresponding to a catalyst efficiency of 170 kg per g of Ti. The polymer had a bulk density of 460 g/l, a reduced specific viscosity of 4.5 dl/g, measured at 135° C. in a 0.1% solution in decalin, it was free from fine particles and the ball indentation hardness was found to be 71 N/mm$^2$.

EXAMPLE 4

4.1 Preparation of catalyst component A 4

The reduction of TiCl$_4$ was carried out with the same amounts and under the same conditions as specified in Example 2.1. After stirring for 3 days, the precipitated solid was separated and washed with toluene. The filtrate and the wash solutions were combined and in the darkbrown to black solution the total amount of titanium was determined colorimetrically and the trivalent titanium was determined cerimetrically. 75% of the total titanium was contained in the solution in the form of Ti$^{III}$.

3.3 g of the reaction product of magnesium chloride and benzoic acid ethyl ester, prepared as described in Example 1.1, were suspended in 10 ml of toluene and, while stirring under argon at 80° C., 180 ml (corresponding to 11 millimols of Ti) of the darkbrown to black TiCl$_3$-containing solution was added dropwise. The reaction mixture was then maintained for 2 hours at 80° C. After cooling to room temperature, the solid was filtered off with suction with the exclusion of air and humidity and washed two times, each time with 100 ml of toluene, and then another two times, each time with 100 ml of the gasoline fraction heated to 70° C. Finally, it was suspended in 100 ml of the gasoline fraction. The titanium content of the suspension was determined colorimetrically. In the filtrate no trivalent titanium could be detected by cerimetry.

4.4 Polymerization of propylene

Propylene was polymerized and the polymer worked up under the condition specified in Example 1.2. As catalyst components there were used 0.75 millimol (calculated on Ti) of catalyst component A 4, 6.6 millimols (1.06 ml) of p-toluic acid ethyl ester as stereoregulator (component C) and 25 millimols (3.2 ml) of aluminum triethyl (component B). 7.2 kg of isotactic polypropylene were obtained, corresponding to a catalyst efficiency of 200.4 kg of polypropylene per g of Ti. The polymer contained no fine particles, it had a bulk density of 458 g/l, a reduced specific viscosity of 3.4 dl/g, determined at 135° C. in a 0.1% solution in decalin, and a ball indentation hardness of 80 N/mm$^2$. A Cl content of 28 ppm was found in the polymer. No corrosion was observed in processing even without addition of an acid binding agent, such as calcium stearate.

EXAMPLE 5

5.1 Preparation of catalyst component A 5

A 250 ml, four-necked flask provided with stirrer and thermometer was charged, with the exclusion of air and humidity (argon atmosphere), with 70 ml of a 20% by weight solution of aluminum isoprenyl (50 millimols) in a gasoline fraction. At −2° C., 11 ml of titanium tetrachloride (100 millimols) were metered in over a period of 2 hours and then the mixture was stirred for 3 hours at −2° C. A darkbrown precipitate separated. After stirring for 24 hours at room temperature, the content of trivalent titanium was determined cerimetrically. It was found that all titanium tetrachloride had been reduced. By adding about 30 ml of the gasoline fraction, a content of 1 mol of TiCl$_3$/l was obtained.

4.2 g of the reaction product of magnesium chloride and benzoic acid ethyl ester, prepared as described in Example 1.1, were suspended in 50 ml of the gasoline fraction. While stirring under argon at 80° C., 12 ml (corresponding to 12 millimols of Ti) of the above TiCl$_3$-containing suspension were added over a period of 10 minutes. The reaction mixture was kept for 2 hours at 80° C. After cooling to room temperature, the solid was filtered off with suction and washed twice, each time with 100 ml of the gasoline fraction and suspended in 100 ml of the gasoline fraction. The titanium content was determined colorimetrically.

5.2 Polymerization of propylene

The polymerization was carried out as described in Example 3.2. The following catalyst components were used:

0.5 millimol (calculated on Ti) of the TiCl$_3$-containing catalyst component A 5, prepared according to Example 5.1, 2.3 millimols (0.37 ml) of p-toluic acid ethyl ester as stereoregulator (component C) and 10 millimols (1.37 ml) of aluminum triethyl (component B). 1.8 kg of polypropylene were obtained, corresponding to a catalyst efficiency of 75.3 kg per g of Ti. The polymer had a bulk density of 350 g/l, a reduced specific viscosity of 4.8 dl/g, measured at 135° C. in a 0.1% solution in decalin, and a ball indentation hardness of 66 N/mm$^2$.

EXAMPLES 6 TO 11

The amounts of anhydrous magnesium chloride and the organic compounds indicated in the following table were mmilled under nitrogen for 100 hours in a vibration mill. The steel vessel used had a capacity of 1 liter and contained 2 kg of stainless steel balls of a diameter of 15 mm.

8.1 g of the reaction products of magnesium chloride and the organic compounds specified in the table were suspended in 50 ml of toluene. While stirring under argon at 80° C., 60.35 ml (27 millimols of Ti) of the TiCl$_3$-containing suspension, prepared as described in Example 2, were dropped in over a period of 10 minutes. The reaction mixture was then maintained for 2 hours at 80° C. After cooling to room temperature, the solid was filtered off with suction with the exclusion of air and humidity and washed two times, each time with 50 ml of toluene, and then another two times, each time with 50 ml of a gasoline fraction heated to 70° C. The Ti-content of the suspension in the gasoline fraction was determined colorimetrically.

Polymerization of propylene

Polymerization of propylene was carried out as described in Example 3.2 with the amounts of catalyst components as indicated. The catalyst efficiency, the relative specific viscosity, the bulk density and the ball indentation hardness are indicated in the table.

TABLE

| Example | reaction of MgCl$_2$ with organic compounds | | | C$_3$H$_6$ polymerization | | | |
|---|---|---|---|---|---|---|---|
| | MgCl$_2$ in g | organic compound type | amount in g | catalyst efficiency kg/1 g Ti | RSV dl/g | bulk density g/l | ball indentation hardness N/mm$^2$ |
| 6 | 73.2 | p-toluic acid-methyl ester | 17.7 | 73 | 5.1 | 380 | 69 |
| 7 | 77.2 | p-toluic acid-ethyl ester | 19.76 | 139 | 5.5 | 420 | 66 |
| 8 | 79.6 | anisic acid-ethyl ester | 23.1 | 138 | 5 | 390 | 67 |
| 9 | 72.2 | methylethyl-phosphinic acid isobutyl ester | 19.1 | 100 | 4.5 | 325 | 66 |
| 10 | 80.5 | cycloheptatriene-1,3,5 | 12 | 75 | 6.0 | 337 | |
| 11 | 73 | cyclooctatetraene | 12.4 | 84 | 5.4 | 371 | |

What is claimed is:

1. A process for the manufacture of a mixed catalyst which comprises
   to form a first component, contacting the titanium trichloride-containing reaction product of reduction, in an inert diluent at a temperature of from −50° C. to +80° C., of titanium tetrachloride by an organic compound of a metal of main group I, II or III of the Periodic Table of the elements with a magnesium halide complex, obtained by reacting a magnesium halide with an electron donor selected from the group consisting of benzoic acid ethyl ester, benzoic acid methyl ester, p-toluic acid ethyl ester, p-toluic acid methyl ester, anisic acid ethyl ester, anisic acid methyl ester, cycloheptatriene-1,3,5 and cyclooctatetraene, and
   mixing with said first component a halogen-free organo-aluminum compound and a stereoregulator selected from the group consisting of cyclopolyenes, phosphinic acid esters, hexamethyl-phosphoric acid trisamide, 1,2-dimethoxybenzene and aromatic carboxylic acid esters with the provision that said halogen-free organo-aluminum compound and stereoregulator are substantially unreacted with one another.

2. A process as defined in claim 1, which comprises contacting an amount of said reduction reaction product with an amount of the magnesium halide complex such that reduced titanium compound in the reduction reaction product consists said complex in an excess of greater than 30% by weight, calculated on the complex.

3. A catalyst prepared according to the process defined in claim 1 or 2.

4. A process as defined in claim 2, wherein said excess is of from 40 to 200% by weight, calculated on said complex.

5. A catalyst prepared according to the process defined in claim 4.

6. A process as defined in claim 1, wherein said organic compound of a metal of main group I, II or III of the Periodic Table of the elements is selected from the group consisting of organo-aluminum compounds of the formula $AlR_{3-n}X_n$ in which R is alkyl of from 1 to 6 carbon atoms, X is R or halogen and n is zero, 1 or 2, reaction products of aluminum trialkyls, the alkyl moieties of which are of from 1 to 6 carbon atoms, with dienes of from 4 to 8 carbon atoms, and reaction products of aluminum dialkyl hydrides, the alkyl moieties of which are of from 1 to 6 carbon atoms, with dienes of from 4 to 8 carbon atoms.

7. A catalyst prepared according to the process defined in claim 6.

8. A process as defined in claim 1, wherein the electron donor is cycloheptatriene-1,3,5 or cyclooctatetraene.

9. A catalyst prepared according to the process defined in claim 8.

10. A process as defined in claim 1, which comprises reducing titanium tetrachloride in an inert, saturated liquid aliphatic hydrocarbon, a mixture of hydrocarbons or a liquid aromatic hydrocarbon.

11. A catalyst prepared according to the process defined in claim 10.

12. A process as defined in claim 1, wherein the reduction reaction product is made by adding the organo-aluminum compound to the titanium tetrachloride in an amount such that the molar proportion of titanium tetrachloride to organo-aluminum compound is of from 1:0.2 to 1:1.5.

13. A catalyst prepared according to the process defined in claim 12.

14. A process as defined in claim 1, which comprises adding the reaction product of reduction of titanium tetrachloride to the magnesium halide complex and contacting these with one another at a temperature of from $-50°$ to $+150°$ C.

15. A catalyst prepared according to the process defined in claim 14.

16. A process as defined in claim 1, which comprises mixing the first component, halogen-free organo-aluminum compound and stereoregulator in amounts such that the product catalyst contains a molar proportion of said organo-aluminum compound to said first component of from 5:1 to 200:1, and a molar proportion of said organo-aluminum compound to stereoregulator of greater than 1:1.

17. A catalyst prepared according to the process defined in claim 16.

18. A process for the manufacture of a mixed catalyst which consists essentially of to form a first component, contacting the titanium trichloride-containing reaction product of reduction, in an inert diluent at a temperature of from $-50°$ C. to $+80°$ C., of titanium tetrachloride by an organic compound of a metal of main group I, II or III of the Periodic Table of the elements with a magnesium halide complex, obtained by reacting a magnesium halide with an electron donor selected from the group consisting of benzoic acid ethyl ester, benzoic acid methyl ester, p-toluic acid ethyl ester, p-toluic acid methyl ester, anisic acid ethyl ester, anisic acid methyl ester, cycloheptatriene-1,3,5 and cyclooctatetraene, and mixing with said first component a halogen-free organo-aluminum compound and a stereoregulator selected from the group consisting of cyclopolyenes, phosphinic acid esters, hexamethyl-phosphoric acid trisamide, 1,2-dimethoxybenzene and aromatic carboxylic acid esters with the provision that said halogen-free organo-aluminum compound and stereoregulator are substantially unreacted with one another.

19. A catalyst prepared according to the process defined in claim 18.

* * * * *